United States Patent Office 3,546,122
Patented Dec. 8, 1970

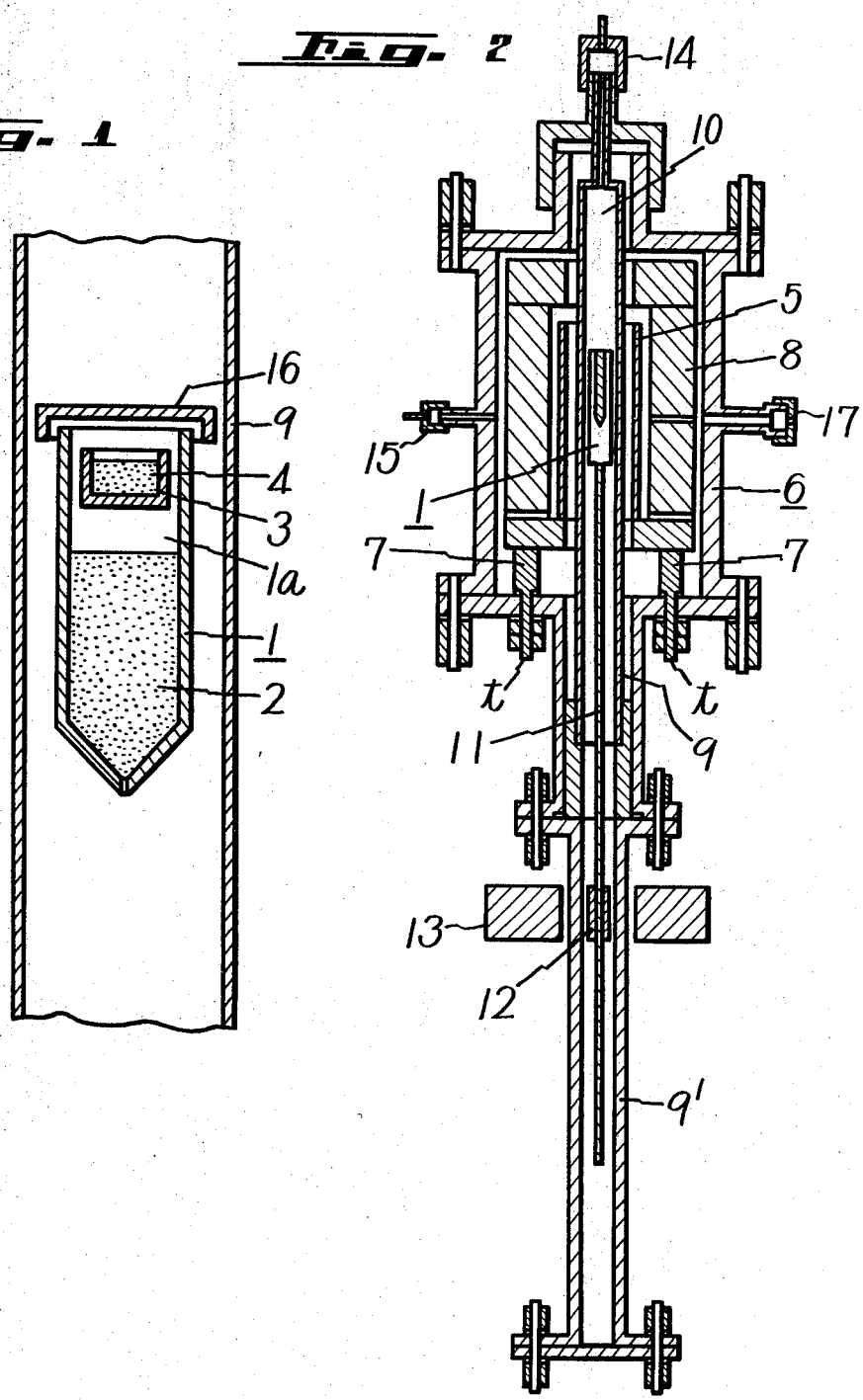

---

3,546,122
METHOD OF MAKING OXIDE MAGNETIC MATERIAL
Minoru Nishizawa, Tokyo, and Shigehisa Harada and Yoshimi Tanuma, Kawasaki-shi, Japan, assignors to Nippon Columbia Kabushikikaisha (Nippon Columbia Co., Ltd.), Tokyo, Japan, a corporation of Japan
Filed Aug. 23, 1967, Ser. No. 662,620
Claims priority, application Japan, Aug. 26, 1966, 41/56,230
Int. Cl. C04b $35/36, 35/38$
U.S. Cl. 252—62.62   6 Claims

ABSTRACT OF THE DISCLOSURE

The method of making a magnetic ferrite in which materal consisting of alpha $Fe_2O_3$ and different components selected from the group consisting of Mn-Zn, Mn-Mg and Mn-Ca is heated to a temperature of at least about 1000° C. under a gas pressure of at least about 100 atmospheres provided by a gaseous atmosphere made up largely of an inert gas and a small proportion of oxygen.

BACKGROUND OF THE INVENTION

Field of the invention

The present invention relates to a method of making an oxide magnetic product such as, for example, ferrite including the steps of mixing different components of a raw material for the oxide magnetic product and heating the same in a furnace in an atmosphere of approximately 100 atm.

Description of the prior art

For the manufacture of an oxide magnetic material such, for example, as ferrite of Mn-Zn system, there have heretofore been proposed a sintering method, a melting method, the so-called Bridgman method. In the sintering method raw material components, for instance, $\alpha$-$Fe_2O_3$, ZnO and $MnCO_3$ are mixed in a certain ratio, for example, about 50 to 55 mols of $\alpha$-$Fe_2O_3$, about 15 to 25 mols of ZnO and about 20 to 35 mols of $MnCO_3$, and the resulting mixture is sintered at a temperature ranging from about 1200° C. to 1500° C. in an inert gas atmosphere having mixed therein a small amount of oxygen under a certain pressure, and in the melting method the mixture is molten at a temperature exceeding about 1600° C. and is then cooled down to normal temperature. The Bridgman method is an improvement of the latter.

These conventional methods, however, involve the sintering or melting process of the mixed raw material which must be carried out at a high temperature for a long time, so that evaporable components contained in the raw material, for example, ZnO and $MnCO_3$ are evaporated and dispersed in the atmosphere during such a process. Thus, the prior art methods are faced with the difficulty that an oxide magnetic material, for example, a ferrite of an initially desired component ratio cannot readily be produced. In other words, it is very difficult stoichiometrically by conventional methods to maintain constant the component ratio of the components such as Fe, Mn and Zn of the oxide magnetic material throughout the manufacturing processes. This introduces the variations in the electromagnetic characteristics of the finished products and it is particularly true in the case where the oxide magnetic material is in the state of a single crystal.

Furthermore, in the prior art methods the pressure of the inert gas atmosphere containing a small amount of oxygen is 1 atm. or 10 atm. at highest. Under such a low pressure in the atmosphere, however, the evaporable components such as ZnO and MnO contained in a mixed raw material for, for example, the oxide magnetic material of Mn-Zn system, are dispersed when held for a long time in the atmosphere at a temperature exceeding 1300° C. This dispersion of such components naturally leads to a difference in the component ratio between the resulting material and the initially mixed raw material. Thus, the component ratio cannot be well maintained at a predetermined value throughout the manufacturing processes.

SUMMARY OF THE INVENTION

The present invention relates to a method of making an oxide magnetic material which is free from the difficulty experienced in the prior art. Namely, the evaporable components such as ZnO and MnO contained in the raw material such as, for example, a Mn-Zn system ferrite are prevented from dispersion in the atmosphere so as to provide an oxide magnetic material containing the required components in a predetermined ratio.

BRIEF DESCRIPTION OF THE DRAWINGS

FIG. 1 is a schematic diagram illustrating one example of a crucible for the use with this invention;

FIG. 2 is a schematic diagram illustrating one example of a furnace for use with this invention.

DESCRIPTION OF THE PREFERRED EMBODIMENT

Figure 3:
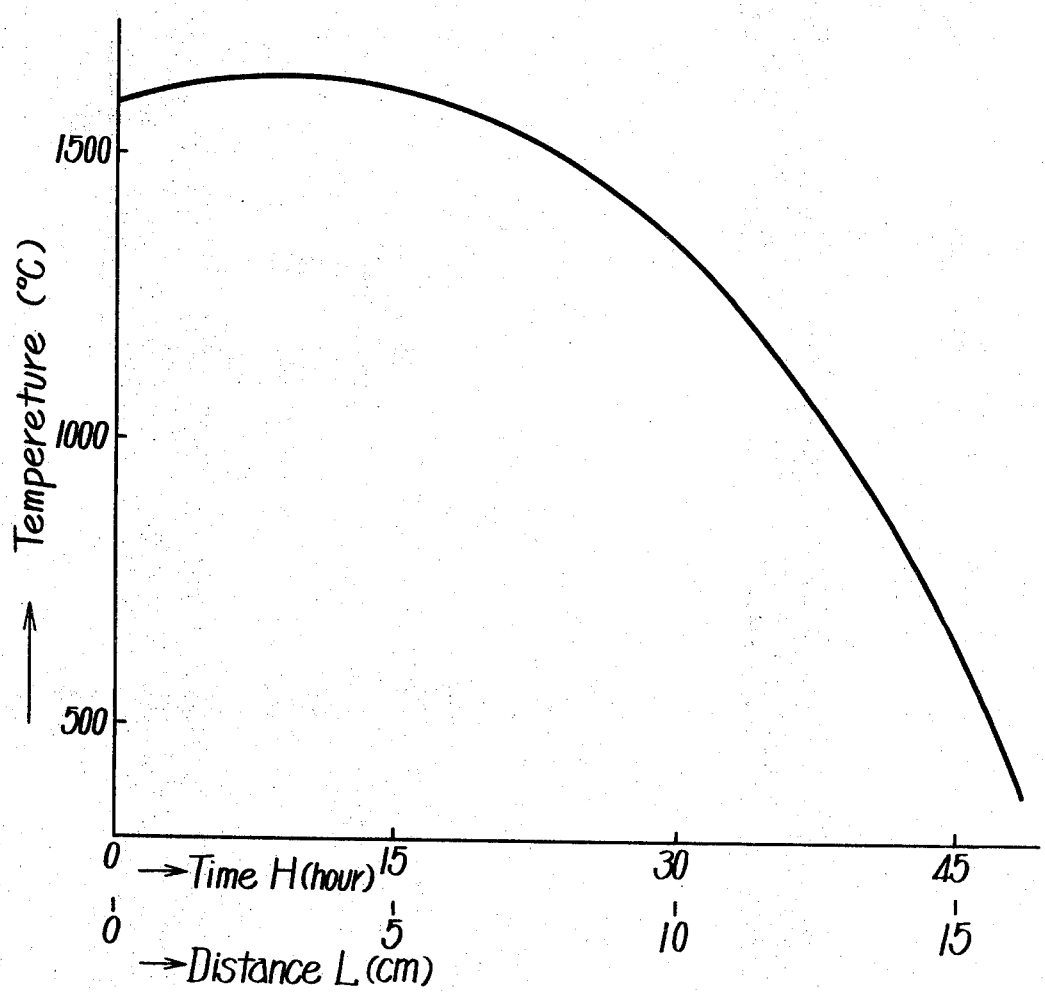
FIG. 3 is a graph showing the temperature gradient in the furnace depicted in FIG. 2 and illustrating the relationship between temperature and time for the formation of a single crystal of an oxide magnetic material.

In this invention, the pressure of the inert gas atmosphere in a furnace is raised to exceed 100 atm. and the sintering or melting operation is carried out under such a high pressure so as to prevent the evaporation of the evaporable components contained in a raw material of an oxide magnetic product to be ultimately obtained, for example, ZnO and MnO into the atmosphere and hence ultimately enable the provision of an oxide magnetic material of little variations in the component ratio. It is considered that the molecules of the inert gas increase with an increase in the pressure of the atmosphere and, as a result, the mean free path of the evaporized molecules of the evaporable components is somewhat controlled to suppress the evaporation of such components.

However, a mere increase of the pressure of the inert gas atmosphere cannot essentially permit reduction of the vapor pressure of ZnO or MnO vapors to zero, namely inhibiting evaporation of them. For eliminating the unwanted evaporation of the raw material components, in the present invention the same materials as evaporable components, for example, ZnO and MnO contained in the raw material are additionally put in the furnace together with the mixed raw material and are simultaneously heated in an inert gas atmosphere containing oxygen and held under an elevated pressure of the atmosphere. Thus, ZnO and MnO additionally put in the furnace are evaporated together with those contained in the raw materials. As is apparent from the laws of Dalton that the vapor pressure of a certain component capable of being evaporated in a certain volume is constant at a constant temperature, that is, the amount of, for example, ZnO or MnO capable of being evaporated in the furnace is constant irrespective of the amount of the mixed raw material placed in the furnace, if the volume and temperature of the furnace are constant. In the present invention certain amounts of ZnO and MnO are inserted into the furnace other than those contained in the raw material for ferrite and they are held in such a condition as to evaporate more readily than those of the raw material, so that ZnO and MnO additionally inserted primarily evaporate in the furnace, namely in the atmosphere, to a certain vapor pressure while those of the raw material hardly evaporate in the atmosphere. Therefore, the component ratio of the raw material components including ZnO and MnO remains substantially unchanged in the product. Thus, the additional insertion of such evaporable components in the furnace provides an oxide magnetic material of a predetermined component ratio of excellent electromagnetic characteristics.

With reference to the drawings this invention will hereinafter be described more in detail. As illustrated in FIG. 1, a certain amount of a raw material 2 of a product to be made consisting of required components in a predetermined ratio is put in a crucible 1, leaving space 1a in the crucible 1 above the raw material 2, and a pot 3 is disposed in the space 1a. The pot 3 contains therein materials 4 same as the evaporable components contained in the raw material 2 such, for example, as ZnO and MnO in the example. The crucible 1 is inserted into a hollow cylinder 9 and is heated. In this case the hollow cylinder 9 has sealed therein an inert gas and is held under a pressure exceeding 100 atm., as described in the foregoing. Further, a cover 16 is mounted on the crucible 1, if necessary, while leaving a path leading to the outside so as to avoid excessive evaporation of the materials 4 such as ZnO and MnO. Thus, the materials 4 in the pot 3 are held at the same temperature as the raw material 2 when heated by means of a heater 5 such as depicted in FIG. 2. Since the materials 4 or ZnO and MnO in the pot 3 are more readily evaporated than those contained in the raw material 2, the former are evaporated earlier than the latter to increase the vapor pressure of ZnO and MnO in the atmosphere up to approximately a predetermined maximum value, with the result that the evaporation of ZnO and MnO contained in the raw material 2 is substantially suppressed. Accordingly, the ratio of ZnO and MnO of the raw material 2 can be held substantially at the initial value.

Although the foregoing description has been made in connection with the case where the pot 3 containing therein evaporable ZnO and MnO components and the crucible 1 are both disposed in the furnace and are simultaneously heated for supplying ZnO and MnO vapors in the atmosphere only from the material 4 contained in the pot 3, the same results can be obtained by introducing ZnO and MnO vapors into the hollow cylinder 9 from the outside through an inlet 14 such as illustrated in FIG. 2.

The present invention will hereinafter be described with specific examples.

EXAMPLE I

About 53 mols of $\alpha$-$F_2O_3$, about 28 mols of $MnCO_3$ and about 19 mols of ZnO are homogeneously dispersed in methyl alcohol by milling in of a ball mill for about 24 hours or so, and the resulting mixture is filtered, dried and powdered, and thereafter being calcined in an inert gas containing 99.99% argon at approximately 1000° C. for about four hours. The powdered material thus produced is put in a platinum crucible and is inserted into a furnace, such as shown in FIG. 2, in which the formation of a single crystal is accomplished by the Bridgman method in an atmosphere held under a high pressure at an elevated temperature in accordance with the diagram shown in FIG. 3.

A description will be given, by way of example, of the aforementioned furnace in which the atmosphere is held at a high temperature under a high pressure. In FIG. 2 reference numeral 6 designates generally a high pressure container, in which the graphite heater 5 is disposed. Electrodes 7 for supporting the graphite heater 5 and applying a current thereto are secured to the container 6, and their ends $t$ are led out to the outside and connected to a power source, though not shown. Between the graphite heater 5 and the container 6 an adiabatic shielding member 8 is disposed and the hollow cylinder 9 is positioned inside of the graphite heater 5, inside of which is provided a specimen heating chamber 10, and an atmosphere containing oxygen is introduced into the chamber 10. In this case, the atmosphere in the hollow cylinder 9 is completely isolated from that of the graphite heater 5. The crucible 1 is placed in the specimen heating chamber 10 while being disposed centrally of the heating room 10 by means of a support 11 positioned substantially along the axis of the hollow cylinder 9. The support 11 has a male screw formed on the periphery thereof at its lower end, with which a magnet 12, having formed therein a female screw, is threadably engaged. The magnet 12 cannot move in a vertical direction in a hollow cylinder 9' which is arranged coaxially with the hollow cylinder 9 and supports the container 6 but the magnet 12 is rotatably mounted on the support 11 by means of, for example, a bearing, though not shown. Another magnet 13 is rotatably mounted about the hollow cylinder 9' in opposing relation to the aforementioned magnet 12. Consequently, the magnet 12 can be rotated with the rotation of the magnet 13. In this case, the magnet 12 can rotate but cannot move up and down as above described, so that the support 11 and accordingly the crucible 1 supported thereby are moved up and down in the hollow cylinder 9 by the rotation of the magnet 12. A mixture gas containing about 95% argon and about 5% oxygen is introduced into the hollow cylinder 9 up to approximately 130 atm. through the inlet 14 of the hollow cylinder 9, while an inert gas is introduced into a space between the container 6 and the hollow cylinder 9 through an inlet 15 to such an extent that its pressure balances with that of the aforementioned gas mixture sealed in the hollow cylinder 9. During operation the pressures of the gas mixture and the inert gas are always held substantially in equilibrium and constant, independently of temperature variations, by means of a balancer provided, for example, on the hollow cylinder 9, though not illustrated. In the crucible 1 there is disposed a pot 3 having contained therein, for example, about 3 g. of ZnO and 3 g. of MnO, as depicted in FIG. 1.

The temperature in the atmosphere near the center of the graphite heater 5 can be measured by, for example, a thermocouple inserted through an inlet 17, and further the temperature in the atmosphere near the crucible 1 can also be measured by the thermocouple inserted into the hollow cylinders 9 and 9' through an inlet provided in relation to the hollow cylinder 9', though not shown.

The furnace is designed with such a temperature gradient that the temperature in the furnace, particularly in the hollow cylinder 9, is the highest at the center thereof and gradually decreases axially outwardly therefrom. Accordingly, the furnace is heated so that the temperature of the center of the furnace exceeds the melting point of the raw material, for example, by approximately 30° C. to 40° C., and then the crucible 1 having the raw material 2 therein, with the pot 3 containing the evaporable materials 4 disposed therein, is mounted on the support 11 at a location a little higher than the center of the furnace, namely at a position where the temperature is somewhat lower than the aforementioned melting point. Thereafter, the crucible 1 is gradually brought down by operating the magnets 12 and 13 in accordance with the graph of FIG. 3. In short, the crucible 1 is heated from a temperature lower than the melting point of the raw material up to the melting point and is then cooled down to provide an oxide magnetic material.

In FIG. 3 the ordinate represents in ° C. the temperature T in the furnace (in the hollow cylinder 9), while the abscissa represents the distance L of the crucible 1 from its initial position in centimeter and the time H for shifting the crucible 1 down from its initial position in the furnace in hours. The origin 0 of the position of the crucible 1 in the furnace is at a location slightly higher than the center of the furnace, and the origin 0 of the time indicates the time when the crucible 1 is initially moved.

The oxide magnetic material thus produced is referred to as a specimen A.

EXAMPLE II

The same materials as those in the Example I are used, but the pot 3 with the material put therein is not employed, namely only the raw material 2 is put in the crucible 1. The crucible 1 is inserted into the furnace and subjected to the heating process in an atmosphere containing about 95% argon and about 5% oxygen, held under a pressure of about 130 atm. The heating process is similarly carried out in accordance with the curve of FIG. 3, as in the Example I. The resulting oxide magnetic product is referred to as a Specimen B.

EXAMPLE III

The same materials as those mentioned above are treated under the same conditions as in the Example II, while the atmosphere is held at 1 atm. as in the conventional method. The resulting magnetic material is referred to as a Specimen C.

The following table shows the ratio of the components contained in the specimens obtained in the foregoing examples and their electromagnetic characteristics.

TABLE

| Specimen: | Amount decreased, percent | | Permeability $\mu$ (1MC) | Quality factor, Q |
|---|---|---|---|---|
| | ZnO | MnO | | |
| A | 0 | 0 | 1,500 | 12 |
| B | 2 | 0.3 | 800 | 5 |
| C | 28 | 5 | 200 | 2 |

As is apparent from the table, the electromagnetic characteristics can be enhanced by increasing only the pressure of the atmosphere as in the Example II, and the method of the Example I provides an oxide magnetic material of exactly the same composition as that of the raw material on an oxide and of highly excellent electromagnetic characteristics.

Further, since ZnO is more easily evaporable than MnO, it is also possible to evaporate only ZnO in the atmosphere. While the present invention has been described in connection with the manufacture of a Mn-Zn system oxide magnetic material, the present invention is applicable to the manufacture of a Mn-Mg system oxide magnetic material or a Mn-Ca system oxide magnetic material. Namely, evaporable components contained in a raw material are similarly heated in a high pressure atmosphere or additional evaporable components are heated together with the raw material to provide an oxide magnetic material of a desired component ratio and hence excellent electromagnetic characteristics. In the foregoing the present invention is applied to the Bridgman method, but the invention can be applied to the sintering method, the melting method or the like.

It will be apparent that many modifications and variations may be effected without departing from the scope of the novel concepts of this invention.

We claim as our invention:

1. A method of making a magnetic ferrite, which comprises mixing together in a predetermined ratio alpha $Fe_2O_3$ and the oxide or oxide-forming components of a system selected from the group consisting of Mn-Zn, Mn-Mg, and Mn-Ca, heating the resulting mixture to a temperature of at least about 1000° C. under a gas pressure of at least about 100 atmospheres provided by an atmosphere of inert gas containing a small amount of oxygen so as to provide an oxide magnetic material of the same composition on an oxide basis as that of the raw material.

2. A method as defined by claim 1 wherein said gaseous mixture contains about 95% of argon and 5% of oxygen.

3. A method as defined by claim 1, wherein undesired evaporation of one of said components present is suppressed by supplying to said gaseous atmosphere vapors of said one component from an independent source.

4. A method as defined by claim 1, wherein other evaporable components identical with the evaporable components in said resulting mixture are separately vaporized and the vapors so produced are admixed with already vaporized components in said resulting mixture in order to suppress the evaporation of the corresponding evaporable components in said resulting mixture.

5. A method as defined by claim 4, wherein said resulting mixture is largely confined within a first heating zone and said evaporation of said other evaporable components is carried out in another zone that is in communication with said first heating zone.

6. The method in accordance with claim 1 in which said system is manganese carbonate-zinc oxide.

References Cited

UNITED STATES PATENTS

| 3,402,993 | 9/1968 | Ferritti et al. | 23—51 |
| 3,423,320 | 1/1969 | Balthi | 252—62.56 |

FOREIGN PATENTS

| 1,290,656 | 3/1962 | France | 252—62.2 |

TOBIAS E. LEVOW, Primary Examiner

ROBERT D. EDMONDS, Assistant Examiner

U.S. Cl. X.R.

252—62.63, 62.64